Figure 1:
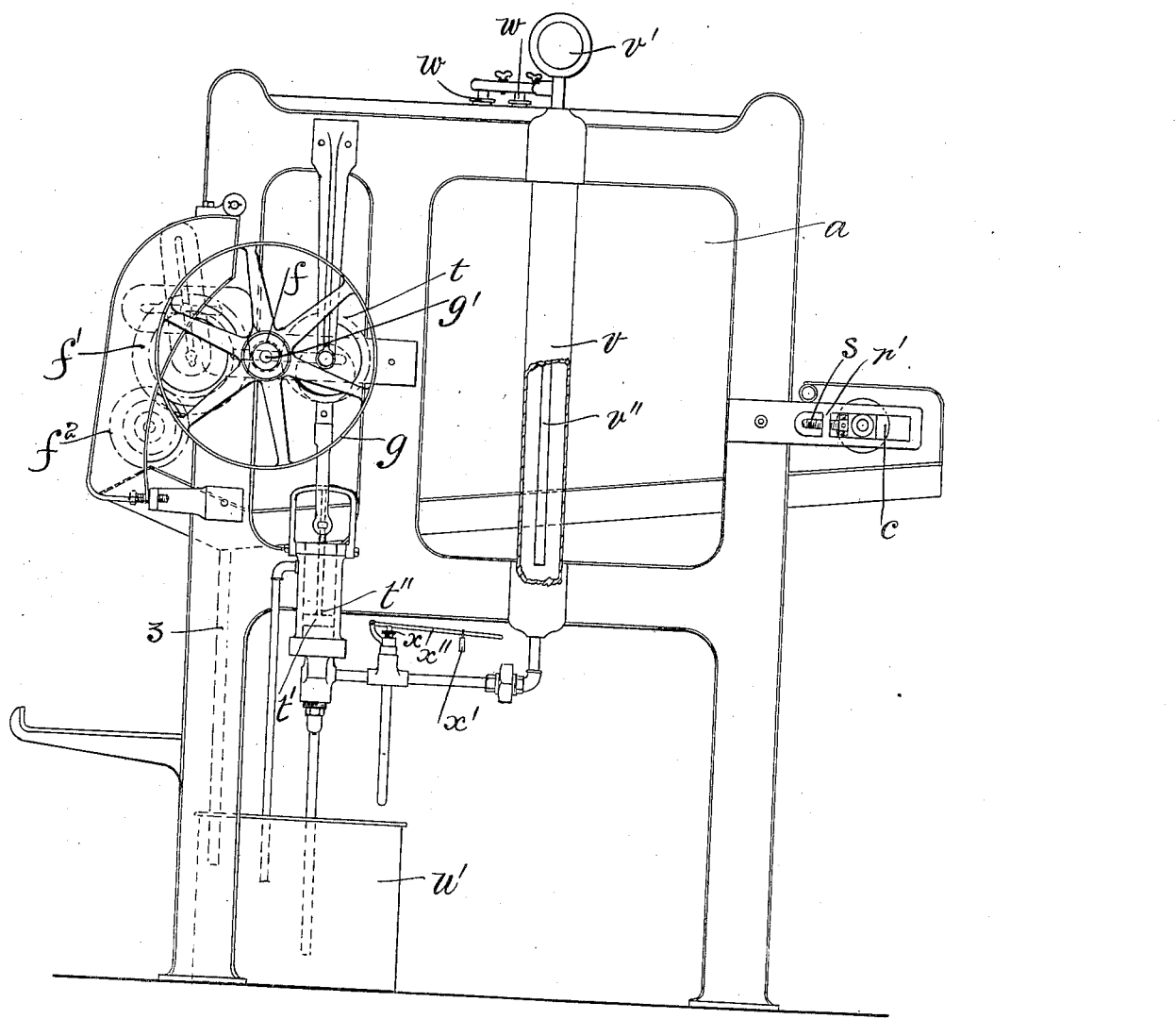

No. 846,373. PATENTED MAR. 5, 1907.
G. & A. WRAY.
APPARATUS FOR SPRAYING AND CONDITIONING YARNS.
APPLICATION FILED JULY 17, 1905.

3 SHEETS—SHEET 1.

Witnesses
Inventors
George Wray
Arthur Wray
Attorneys

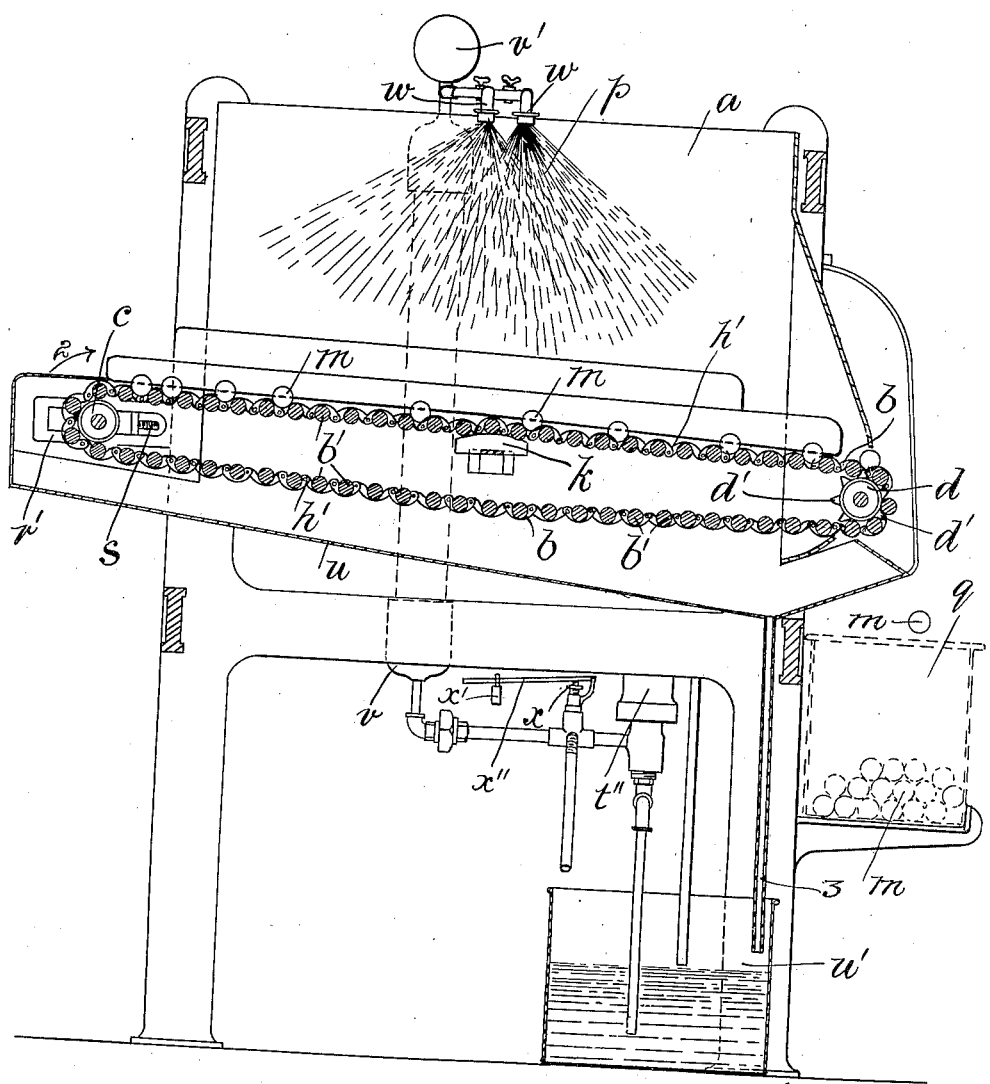

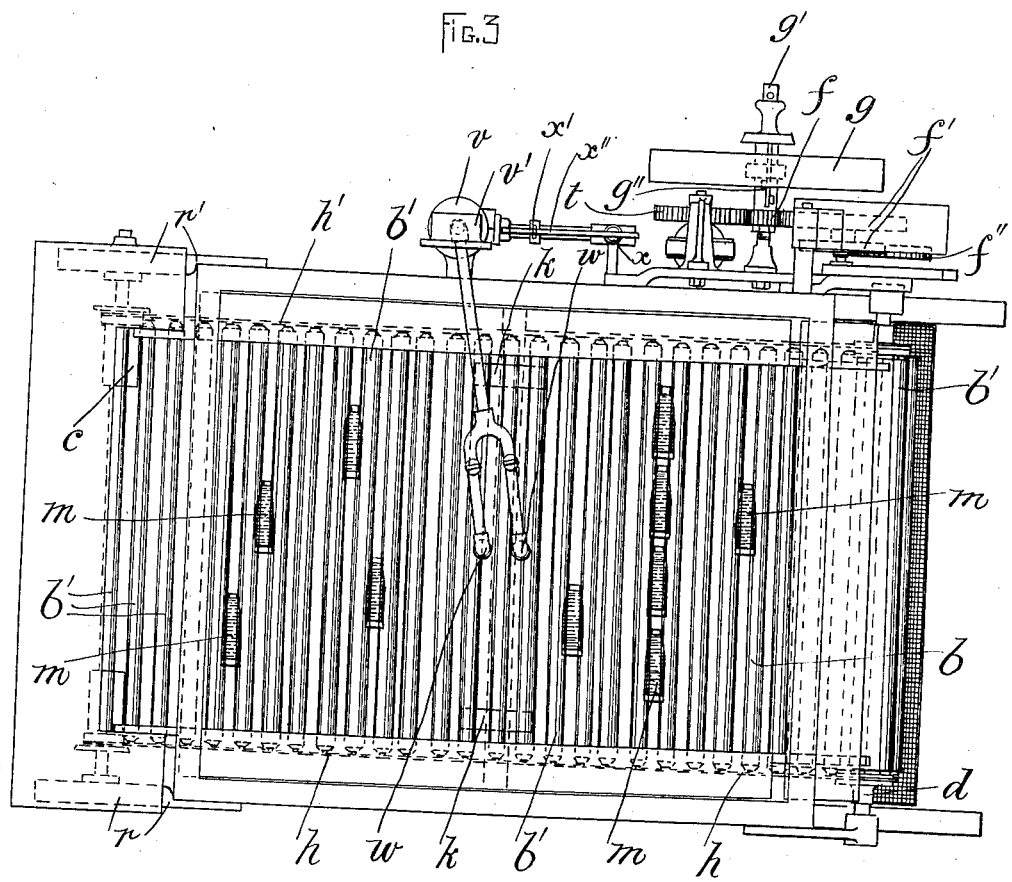

UNITED STATES PATENT OFFICE.

GEORGE WRAY AND ARTHUR WRAY, OF KEIGHLEY, ENGLAND.

APPARATUS FOR SPRAYING AND CONDITIONING YARNS.

No. 846,373.      Specification of Letters Patent.      Patented March 5, 1907.

Application filed July 17, 1905. Serial No. 269,944.

*To all whom it may concern:*

Be it known that we, GEORGE WRAY and ARTHUR WRAY, subjects of the King of Great Britain, and residents, respectively, of 34 Quarry street and 6 Thorn street, Keighley, in the county of York, England, have invented certain new and useful Improvements in Apparatus for Spraying and Conditioning Yarns, of which the following description, together with the accompanying drawings, is a specification.

This invention relates to apparatus or mechanism for use in subjecting yarns or threads of fibrous substances to the actions of water or moisture in order to bring said substances into any desired state of humidity that occasion may require for purposes well understood; and the object of our said invention is to provide means or apparatus that shall be continuous in action and that shall subject all the outer surfaces of the cops, bobbins, or spools of yarn treated thereby to any desired or limited extent that circumstances may necessitate and that without requiring any attention on the part of the operative further than the adjustment of the apparatus to carry out the process with regularity and precision.

In the accompanying sheets of drawings, which are illustrative of our said invention, Figure 1 is a side elevation, partly in section, of apparatus or mechanism constructed in accordance with our invention. Fig. 2 is a sectional side elevation of said apparatus as seen in the direction opposite to that shown by Fig. 1. Fig. 3 is a view of the apparatus as seen from above.

In carrying our invention into effect we make use of a receptacle or chamber $a$, which may be open or partly open at the top, as shown, or it may be entirely inclosed. At the lower part of this chamber we arrange a traveling apron $b$, which takes over the roller $c$ at one side of the machine and over the roller $d$ at the other side of said machine. This roller $d$ has ribs $d'$, which intercede between the cross-pieces $b'$ of the apron $b$, so that as this roller $d$ is rotated through the train of wheels $f f' f''$ by the driving-pulley $g$ said apron $b$ is caused to move in the direction indicated by the arrow 2 around the roller $c$.

The apron $b$ is preferably constructed by side chains $h h'$, formed to receive the cross-pieces $b'$, which are pivoted at each end upon them in such a manner as to be free to rotate, so that in traveling through the chamber $a$ on coming into contact with the contact-piece $k$ said rollers $b'$ will be rotated through a space sufficient to turn the cops, bobbins, or spools $m$, resting upon and carried by them, through about half a revolution. Thus as said cops, bobbins, or spools $m$ are approaching the contact-piece $k$ one-half of their outer surfaces will be exposed so as to be subjected to the humidifying actions of the spray $p$, while on reaching said piece $k$ the rollers $b'$, carrying same, will be revolved to rotate said cops, bobbins, or spools $m$, so as to cause them to present the other parts of their outer surfaces for the actions of said spray $p$ as the apron $b$ continues in its path of motion, until the roller $d$ is reached, where the path of the apron is such as to allow the cops, bobbins, or spools $m$ to fall therefrom on their treatment being finished into the receptacle $q$ beneath.

The guide-roller $c$ is mounted in bearings $r r'$, which have adjusting-screws $s$ to regulate the tension of the apron $b$ by moving said roller $c$ closer to or farther from the roller $d$. The driving-pulley $g$ is mounted to run loosely upon its shaft $g'$ and has a clutch-pin $g''$ for engaging with a clutch-piece on the wheel $f$ when motion has to be transmitted thereto and to the roller $d$, and consequently the apron $b$. The driving-pulley $g$ also transmits motion to wheel $t$, which carries the eccentric for operating the piston $t'$ of the pump $t''$, so that the condensed or accumulated spray which falls into or is gathered by the tray $u$ beneath the apron $b$ and is drained by the pipe 3 into the receptacle $u'$ is raised by this pump $t'$ into an accumulator $v$, having a pressure-gage $v'$, from which it is allowed to escape through the spray-producers $w$ at any desired pressure, thus producing a finer or coarser spray, as circumstances may require, by having the water to issue at a higher or lower pressure.

The pressure at which the contents of the accumulator $v$ (which is illustrated partly in in section by Fig. 1 so as to show the arrangement of the interior discharge-pipe $v''$) may be kept is regulated by the adjustable weight $x'$, mounted on the lever-arm $x''$ of the escape-valve $x$. The farther said weight $x'$ is from the fulcrum of said lever $x''$ the greater will be the pressure in the accumulator $v$ to overcome same when escaping through said valve $x$.

It will be readily understood that the varying of the position of the weight $x'$ will have the effect of varying the pressure in the accumulator without in any manner requiring a varying in the motion of the apron and, through the connecting mechanism, the pumping device. Hence the pressure may be regulated while the machine or apparatus is moving at a uniform speed.

From the foregoing description it will be seen that on the operative placing the cops, bobbins, or spools of yarn upon the apron $b$ at the part over the roller $c$ they will be carried thereby through the chamber $a$ and that the rate of speed of such travel, together with the conditions of the spray $p$ acting upon them, will determine the amount of humidity that is transmitted to them. Hence by regulating the speed of the apron $b$ (as by adjusting the change-wheels $f f' f''$) and by regulating the pressure of the water passing through the spray-producers $w$ (as by adjusting the weight $x'$ on the arm $x''$) the desired results or actions of same upon the yarn under treatment is effected.

It is to be understood that the expression "contained yarn" used herein refers to yarn which is contained on cops, bobbins, spools, or other similar container.

Such being the nature and object of our invention, what we claim is—

1. In apparatus of the class described, a spray-producer, a traveling apron, means for transmitting motion thereto, said means having an independent movement to cause the entire outer surface of the contained yarn to be subjected to the action of the spray, means, including a pump, for supplying a liquid to said spray-producer, and means independent of the pump for controlling the pressure of the liquid.

2. In apparatus of the class described, a traveling apron, change-wheel-driving mechanism for transmitting motion thereto so that the rate of speed thereof may be regulated, and means for causing a spray of water or liquid to fall upon said apron under pressure, said means including independent liquid-supplying and pressure-controlling devices, the apron having an independent movement to cause the entire outer surface of the contained yarn to be subjected to the action of the spray.

3. In apparatus of the class described, a traveling apron, spray-producing devices mounted above said apron, the apron having an independent movement to cause the entire outer surface of the contained yarn to be subjected to the action of the spray, an accumulator, means for supplying water or liquid to said accumulator, and independent means for controlling the supply of liquid to the accumulator.

4. In apparatus of the class described, a traveling apron, spray-producing devices mounted to operate in conjunction with said traveling apron, the apron having an independent movement to cause the entire outer surface of the contained yarn to be subjected to the action of the spray, an accumulator, means for supplying water or a liquid to said accumulator, and means, intermediate said accumulator and said supply means, for controlling the pressure of the liquid in said accumulator.

5. In apparatus of the class described, a traveling apron having rotatable rollers, means whereby said rollers are rotated at one part of their path of motion and means whereby water or a liquid may be sprayed over said apron during its traveling movements substantially as set forth.

6. In apparatus of the character described, a spraying device, and means movable through the spraying zone for passing contained yarn into and through said zone said means having an independent movement to cause the entire outer surface of the contained yarn to be subjected to the spraying action.

7. In apparatus of the character described, a spraying device, means movable through the spraying zone for passing contained yarn into and through said zone said means having an independent movement to cause the entire outer surface of the contained yarn to be subjected to the spraying action, and means for controlling the movement of the contained yarn through said zone to control the extent of spraying action to which the yarn is subjected.

8. In apparatus of the character described, a spraying device and means for supplying liquid thereto under pressure, means movable through the spraying zone for passing contained yarn into and through said zone said means having an independent movement to cause the entire outer surface of the contained yarn to be subjected to the spraying action, and means for regulating the pressure of said liquid.

9. In apparatus of the character described, a spraying device, and a traveling apron adapted to carry contained yarn through the spraying zone, each of the yarn-containers being given a motion on its axis during its passage through said zone.

10. In apparatus of the character described, a spraying device, a traveling apron adapted to carry contained yarn through the spraying zone, and means for imparting a motion on its axis to each of the yarn-containers during its passage through said zone.

In testimony whereof we have affixed our signatures in the presence of two witnesses.

GEORGE WRAY.
ARTHUR WRAY.

Witnesses:
SAMUEL HEY,
JOHN WHITEHEAD.